United States Patent Office 2,830,876
Patented Apr. 15, 1958

2,830,876

PRODUCTION OF ANHYDROUS SODIUM METASILICATE

Isadore Mockrin, Philadelphia, and Oliver Snyder Sprout, Jr., North Hills, Pa., assignors to Pennsalt Chemicals Corporation, a corporation of Pennsylvania No Drawing. Application January 28, 1955
Serial No. 484,813

6 Claims. (Cl. 23—110)

This invention relates to the production of crystalline anhydrous sodium metasilicate by precipitation from a reaction solution, and more particularly to improvements in the process whereby anhydrous sodium metasilicate is precipitated in a particle size that can readily be separated from the mother liquor.

Anhydrous sodium metasilicate has the advantage of not having associated therewith substantial quantities of water as do the sodium metasilicate hydrates. This is of advantage in shipping and handling since for equal bulk substantially more sodium metasilicate is available. This is readily apparent when it is considered that sodium metasilicate pentahydrate, the hydrate which is the most generally commercially available, consists of approximately 42% water by weight.

Anhydrous sodium metasilicate has heretofore been prepared by precipitation from solutions of sodium silicate in which the ratio of $Na_2O$ to $SiO_2$ was approximately 1 to 1. However, the crystals were of such fine form that they could not be separated from the mother liquor. Anhydrous sodium metasilicate could not, therefore, be commercially prepared by this method, and the resulting solution containing the very finely dispersed metasilicate was blended with other materials, such as sodium carbonate or sodium hydroxide to take up the water and give a dry detergent product. This process is described in Patent No. 2,067,227 of January 12, 1937.

It has now been discovered that anhydrous sodium metasilicate can be readily crystallized from aqueous solutions of sodium silicate and crystals of relatively large size obtained which readily separate from the mother liquor if the $Na_2O$ to $SiO_2$ ratio in the solution is maintained within a specific range and if the preparation of the solution and the temperature thereof is controlled within specified limits.

In carrying out the process of the present invention a sodium silicate liquor is first prepared in which the $Na_2O$ to $SiO_2$ ratio is within the range of 1.6 to 3.0, the ratio here and throughout the specification and claims being a weight ratio unless otherwise specifically indicated. The liquor is then digested at a temperature of at least 140° C., some reactions having given good crystal sizes and settling rates at temperatures even as low as 130° C. During the heating, crystals of anhydrous sodium metasilicate precipitate out. Digestion is continued at this temperature of at least 140° C. until the precipitation is substantially complete, this generally taking at least 20 minutes.

After the digestion period, the solution is cooled to a temperature of 80° to 100° C. and the crystals separated from the mother liquor. If the crystals are separated from the mother liquor while at a temperature either much below 70° C. or much above 120° C., an appreciable reduction in the yield of the anhydrous sodium metasilicate product will result. In the preferred practice the temperature is maintained at about 90° C.

The starting sodium silicate solution may be obtained by any conventional method. This may be by digestion of silica in aqueous caustic with the silica and caustic present in the necessary ratio to give a sodium silicate-solution having an $Na_2O$ to $SiO_2$ weight ratio of 1.6:1 to 3.0:1, and a composition wherein the $Na_2O$, $SiO_2$ and water are present in the proportions of $Na_2O$ 27.0 to 42.5%, $SiO_2$ 10 to 22% and water, by difference, 43 to 60%, percents here and throughout the specification and claims referring to weight percent unless otherwise indicated. This may also be done by first starting with an aqueous solution of sodium silicate in which the $SiO_2$ content is substantially greater than the $Na_2O$ content, and then adding sufficient caustic soda to bring the $Na_2O$ to $SiO_2$ ratio into the required range. Of these two procedures the latter is preferred since by the first method some insolubles, generally in the order of 0.24 to 0.44% result. These tend to separate out with the anhydrous sodium metasilicate product.

In the preferred practice of the present invention a starting liquor is used which is an aqueous solution of sodium silicate preferably having a composition within the range of $Na_2O$ 11 to 22 wt. percent, $SiO_2$ 24 to 38 wt. percent and water, by difference, of 42 to 60 wt. percent. This is preferably prepared by digesting a mixture consisting of 26 to 44 parts by weight silica, 14 to 29 parts by weight caustic soda and 36 to 57 parts by weight water. The digestion is preferably carried out at a temperature of 160 to 200° C. Caustic soda and water, if necessary, are then added to this starting solution in sufficient amounts to give an $Na_2O$ to $SiO_2$ weight ratio of 1.6 to 3.0 and a water content of 43 to 60%. The order of addition is important for the best results. If the silicate solution is added to the caustic rather than adding the caustic to the silicate solution, the anhydrous sodium metasilicate starts to precipitate out immediately, and the resulting crystals are much finer, making it more difficult to separate the anhydrous sodium metasilicate product from the mother liquor.

If the caustic is added to the silicate solution, a clear solution results. This solution is heated to a temperature of at least 140° C., the preferred temperature being within the range of 160° to 200° C. As the solution is heated, the anhydrous sodium metasilicate starts to precepitate out. The solution is digested at this elevated temperature until precipitation is complete.

Temperatures well above 200° C. may be used without apparently any deleterious effects. However, there appears to be no particular advantage in going to temperatures much above 200° C. Also, the period of digestion at the elevated temperatures may be as long as desired. However, there appears to be little advantage in digesting over 3 hours.

The best results are obtained when the rate at which the temperature of the solution is raised to the digestion temperature, is controlled so that the temperature of the solution is increased at approximately ½ to 3° C. per minute. More rapid heating may result in the anhydrous sodium metasilicate precipitating out in a somewhat smaller particle size though still readily filterable.

During the digestion period some agitation is used in order to prevent crystal growth and crystal accumulation of the anhydrous metasilicate on the apparatus. The agitation, however, appears to have little effect on the crystal formation though mild agitation appears to somewhat favor crystal growth and the production of white products.

After cooling to approximately 80 to 100° C., the precipitated anhydrous metasilicate is separated from the mother liquor, preferably by centrifuging. In the preferred practice, the precipitated anhydrous metasilicate is then washed with a hot 35 to 40% aqueous solution of sodium metasilicate.

The settling rates of the anhydrous sodium metasilicate crystals, by the present process, are fast and separation by centrifuging is quite rapid. The resulting anhydrous sodium metasilicate cake can be handled essentially as a dry solid, the centrifuged cake giving a weight loss at 200° C. of only about 2 to 7%, when precipitation is carried out by addition of caustic soda to a silicate solution. Anhydrous sodium metasilicate precipitated by digesting silica with aqueous caustic soda gives products with somewhat higher drying losses. Also, the particle size of the precipitated anhydrous metasilicate is excellent, the average size of the particles being in the order of approximately 30 to 40 microns.

After the washing step, the anhydrous metasilicate is preferably dried. This should be done in an atmosphere either free of $CO_2$ or containing only a small amount of $CO_2$ so as to avoid contamination of the resulting product through the formation of sodium carbonate and $SiO_2$. Where the product is not washed, to remove mother liquor, it is much less subject to contamination through the presence of $CO_2$. The normal $CO_2$ content of air is generally not sufficient to raise the insoluble content of washed precipitate, air dried, by more than about 0.08%. Drying in an air atmosphere is, therefore, satisfactory. However, drying apparatus should be avoided which increases the $CO_2$ content of the drying air, such as gas fired furnaces, where the products of combustion would come in contact with the metasilicate being dried.

Practice of the present invention is further illustrated by the following examples. However, these examples are given for purposes of illustration only and should not be considered as limiting the invention.

EXAMPLE 1

An autoclave was charged with 453 parts by weight of flake caustic soda (96%), 382 parts by weight water and 165 parts by weight silica of −200 mesh. The autoclave was then closed and the temperature raised to 180° C. (60 p. s. i. g.) and maintained at this temperature for about 2 hours. The charge was continuously stirred during this digestion period. After 2 hours the product was allowed to cool to about 100° C. and the precipitated sodium metasilicate was then separated from the mother liquor by centrifuging. The solids were then washed with about 600 parts by weight of a hot 40% solution of sodium silicate. After this washing step the solids were dried at a temperature of 200° C., a weight loss of 13% being obtained during the drying operation. The composition of the dried solid product and that of the mother liquor from the centrifuge was as follows:

Table 1

DRIED SOLID (ANHYDROUS SODIUM METASILICATE) COMPOSITION, WEIGHT PERCENT

| | |
|---|---|
| $Na_2O$ | 51.2 |
| $SiO_2$ | 45.8 |
| $H_2O$ | 1.6 |
| Insoluble | 0.24 |

Table 2

MOTHER LIQUOR COMPOSITION, WEIGHT PERCENT

| | |
|---|---|
| $Na_2O$ | 28.2 |
| $SiO_2$ | 2.2 |
| $H_2O$ (by difference) | 69.6 |

In a similar manner sodium silicate solutions having the following compositions were prepared:

| $Na_2O$ | $SiO_2$ | $H_2O$ |
|---|---|---|
| Percent | Percent | Percent |
| 38.8 | 12.6 | 48.2 |
| 32.2 | 12.8 | 55.0 |

These were heated to a temperature of 140° C. and maintained at this temperature until precipitation was complete. This required a total time of about ½ hour not including the time required to reach the temperature of 140° C.

EXAMPLE 2

A stainless steel (type 316) autoclave equipped with a propeller type stirrer and thermowell was charged with 1016 parts by weight of a 27.5% sodium hydroxide solution, 480 parts by weight of $SiO_2$ (−120 mesh) and 4.5 parts by weight of sodium nitrate. The autoclave was then closed and the temperature raised to about 130° C. (10 p. s. i. g.). The charge was maintained at this temperature while blending for about 2 hours, after which time the temperature was raised to about 180° C. (110 p. s. i. g.) and maintained at this elevated temperature for an additional 2 hours after which time digestion of the silica was completed. The product was then cooled to about 100° C., discharged from the autoclave and then permitted to cool overnight to room temperature. The supernatant liquor, which contained a negligible amount of insoluble content, was found on analysis to have the following composition:

| | Weight percent |
|---|---|
| $Na_2O$ | 14.9 |
| $SiO_2$ | 29.0 |
| $H_2O$ (by difference) | 56.1 |
| | 100.0 |

The supernatant liquor was then charged into an autoclave with caustic soda and sodium nitrate, the charge consisting of 844 parts by weight of the liquor, 656 parts by weight of sodium hydroxide (71.9%) and 4.5 parts by weight sodium nitrate. The sodium hydroxide was added to the liquor in the autoclave at a temperature of between 80 and 90° C., at which temperature it was molten. The sodium hydroxide was added slowly to the liquor while the liquor was mechanically stirred.

After the autoclave had been charged in the above manner it was then closed and the temperature of the charge, which at this point was 80° C. was raised to about 180° C. at an average rate of about 0.8° C. per minute. During this time the charge was continuously stirred. After the mixture had reached the temperature of 180° C. (52 p. s. i. g.) it was maintained at this temperature with stirring for about 1 hour, after which time it was cooled to 100° C. and then discharged. The precipitated anhydrous sodium metasilicate which settled rapidly in the mother liquor was removed by centrifuging and a wet cake containing 447 parts by weight obtained. This was dried for 2 hours at about 150° C., the drying loss in weight being less than 3%. The product on analysis was found to be substantially pure anhydrous sodium metasilicate. It was in a dense powder form and was non-dusting.

It will be noted in the above example that the initial sodium silicate solution has been prepared by first heating the reactants at a temperature of 130° C for about 2 hours and then raising the temperature to 180° C and maintaining the reactants at this temperature for about 2 hours. This procedure is based on the further discovery that if in preparing the initial starting liquor, digestion is first partially carried out at a somewhat lower temperature, for example, at about 130 to 150° C., and then completed at the higher temperature of 180° C. or higher, that less pick up of iron from the reactor occurs, with the result that a product substantially free from iron can be obtained.

For commercial production cyclic processes are frequently preferred. When using a cyclic process for preparing anhydrous sodium metasilicate, silica in the form of finely-divided α-quartz, sand, or other suitable form is digested with an aqueous caustic soda solution, generally 20 to 42% NaOH. The digestion is carried out preferably at a pressure of 60 to 200 p. s. i. g. and a temperature of 160 to 200° C. Digestion is continued for approximately 1 to 4 hours. The digested liquor is then permitted to stand until the excess undissolved silica has settled out. The undissolved silica is then removed from the liquor.

The resulting sodium silicate solution, which has an $Na_2O$ to $SiO_2$ weight ratio within the range of 1:1.5 to 1:2.7 is mixed with sufficient sodium hydroxide, preferably in the form of 50 to 72% sodium hydroxide, to bring the $Na_2O$ to $SiO_2$ weight ratio of the solution to within the range of 1.6:1.0 to 3.0:1.0. This solution should contain 27.0 to 42.5% $Na_2O$, 10 to 22% $SiO_2$ and, by difference, 43 to 60% water. As previously stated, the sodium hydroxide is preferably added to the silicate solution in fluid form, i. e. if 70% NaOH is used, it should be heated until molten and the molten caustic soda then added to the sodium silicate solution. The resulting sodium silicate solution is then heated, as previously described, to a temperature of at least 140° C. and digested at this elevated temperature generally for at least 20 minutes. After digestion the precipitated anhydrous sodium metasilicate is removed, preferably by centrifuging, washed with a 35 to 40% solution of sodium metasilicate, as previously described, and then dried. The filtrate is then returned to the pressure digestion vessel together with silica, water and sodium hydroxide in amounts sufficient to adjust the $Na_2O$ and $SiO_2$ content of the mixture to the initial starting ratio of about 1:1.5 to 1:2.7. From this new quantities of the starting solution ($NaO_2$ to $SiO_2$ of 1.6:1.0 to 3.0:1.0), from which the sodium metasilicate is precipitated are prepared.

The anhydrous sodium silicate products of the present invention are free-flowing anhydrous powders having an excellent storage life, the products still remaining free-flowing after having been stored for as long as 6 months in sealed containers. Also, the anhydrous sodium metasilicate product, though finely-divided, is of sufficiently large particle size to be free of the objectionable fine dust which so frequently accompanies products made by other processes and has a surprisingly high bulk density, about 66 (loose) to 77 (packed) pounds per cu. ft.

Having thus described our invention, we claim:

1. The method of making anhydrous sodium metasilicate comprising adding caustic soda to a silicate solution consisting essentially of 11 to 22% $Na_2O$, 24 to 38% $SiO_2$ and 42 to 60% $H_2O$ in sufficient amounts to give a liquid composition having a ratio of $Na_2O$ to $SiO_2$ within the range of 1.6:1.0 to 3:1.0 and consisting essentially of 27 to 42.5% $Na_2O$, 10 to 22% $SiO_2$ and 43 to 60% $H_2O$, heating said solution to at least 140° C., maintaining said solution at above 140° C. until precipitation of anhydrous sodium metasilicate is substantially complete, and separating the precipitated anhydrous sodium metasilicate.

2. The method of claim 1 wherein said initial silicate solution containing 11 to 22% $Na_2O$ is prepared by first digesting silica and an aqueous solution of sodium hydroxide at a temperature of about 130 to 150° C. for about 2 hours and then completing said digestion at a higher temperature.

3. The method of claim 2 wherein said initial digestion is at a temperature of about 130° C. and said final digestion is at a temperature of about 180° C.

4. The process of claim 1 wherein said solution consisting of 27 to 42.5% $Na_2O$, 10 to 22% $SiO_2$ and 43 to 60% $H_2O$ is heated to said temperature above 140° C. at a rate in the order of 0.5 to 3° C. per minute.

5. In the preparation of anhydrous sodium metasilicate the process comprising adding liquid caustic soda of 50 to 72% NaOH content to an aqueous silicate solution having an $Na_2O/SiO_2$ ratio of 1.0:1.5 to 1.0:2.7 in sufficient amounts to give a ratio of $Na_2O$ to $SiO_2$ within the range of 1.6:1.0 to 3.0:1.0 and having a composition consisting essentially of 27 to 42.5% $Na_2O$, 10 to 22% $SiO_2$ and 43 to 60% $H_2O$, heating said solution at a rate of 0.5 to 3° C. per minute to a temperature of at least about 160 to 200° C., digesting said solution at said temperature until precipitation of anhydrous sodium metasilicate is substantially complete, cooling said solution to a temperature of 80 to 100° C., centrifuging at said temperature of 80 to 100° C. to separate the precipitated anhydrous sodium metasilicate, washing said separated precipitate with an aqueous 35 to 40% solution of sodium metasilicate and then drying the washed precipitate.

6. In the preparation of anhydrous sodium metasilicate the process comprising preparing an initial starting solution by digesting a mixture consisting essentially of 26 to 44 parts silica, 14 to 29 parts caustic soda and 36 to 57 parts water at a temperature of 160 to 200° C., separating the undissolved silica, adding caustic soda to the remaining liquor and adjusting the liquor to a solution consisting essentially of 27 to 42.5% $Na_2O$, 10 to 22% $SiO_2$ and 43 to 60% $H_2O$, heating said solution at a rate of 0.5 to 3° C. per minute to a temperature of at least 160 to 200° C., maintaining said solution with the temperature range until precipitation of anhydrous sodium metasilicate is substantially complete, cooling said liquor to a temperature within the range of 80 to 100° C., separating the precipitated anhydrous sodium metasilicate while the temperature is within the range of 80 to 100° C. and then adding silica, caustic and water to the remaining liquor to adjust the liquor to the initial starting mixture from which the initial starting solution was prepared.

References Cited in the file of this patent

UNITED STATES PATENTS

| Number | Name | Date |
|---|---|---|
| 2,017,561 | Baker | Oct. 15, 1935 |
| 2,067,227 | Baker | Jan. 12, 1937 |
| 2,153,872 | McDaniel | Apr. 11, 1939 |
| 2,161,515 | Jaeger et al. | June 6, 1939 |
| 2,282,018 | Baker | May 5, 1942 |
| 2,593,652 | Blanchard | Apr. 22, 1952 |

FOREIGN PATENTS

| Number | Country | Date |
|---|---|---|
| 868,962 | France | Oct. 20, 1941 |
| 451,689 | Great Britain | Nov. 5, 1934 |

OTHER REFERENCES

Merill: "Chemistry of the Soluble Silicates," Jour. of Chem. Education, June 1947, pages 262–269.